(12) United States Patent
Halldorsson

(10) Patent No.: US 7,249,434 B2
(45) Date of Patent: Jul. 31, 2007

(54) PRE-MOUNTED NETS ON DISCHARGING DEVICES AND A METHOD OF MANUFACTURE

(76) Inventor: Bjorn Halldorsson, Dalsbyggd10, 210 Gardabaer (IS)

( * ) Notice: Subject to any disclaimer, the term of this patent is extended or adjusted under 35 U.S.C. 154(b) by 0 days.

(21) Appl. No.: 10/502,339

(22) PCT Filed: Jan. 24, 2003

(86) PCT No.: PCT/IS03/00006

§ 371 (c)(1),
(2), (4) Date: Oct. 19, 2004

(87) PCT Pub. No.: WO03/061374

PCT Pub. Date: Jul. 31, 2003

(65) Prior Publication Data

US 2005/0039371 A1 Feb. 24, 2005

(30) Foreign Application Priority Data

Jan. 25, 2002 (IS) .......................................... 6252

(51) Int. Cl.
*A01K 71/00* (2006.01)
(52) U.S. Cl. .............................................. 43/4.5; 43/7
(58) Field of Classification Search ...................... 43/7, 43/10, 14, 9.8, 4.5, 8
See application file for complete search history.

(56) References Cited

U.S. PATENT DOCUMENTS

| | | | | | |
|---|---|---|---|---|---|
| 371,987 | A | * | 10/1887 | Sowle | 43/14 |
| 957,766 | A | * | 5/1910 | Gilstrap | 43/7 |
| 1,980,452 | A | * | 11/1934 | Tice et al. | 43/4.5 |
| 2,408,367 | A | * | 10/1946 | Brickman | 114/241 |
| 3,165,853 | A | * | 1/1965 | Ansell | 43/7 |
| 3,545,120 | A | * | 12/1970 | Takaoka | 43/44.9 |
| 3,789,532 | A | * | 2/1974 | Ferguson | 43/14 |
| 4,347,680 | A | * | 9/1982 | Kaestner | 43/10 |
| 4,381,617 | A | * | 5/1983 | McSweeny, Jr. | 43/9.8 |
| 4,644,679 | A | * | 2/1987 | Ban | 43/7 |
| 4,693,031 | A | * | 9/1987 | Koetje | 43/44.91 |

* cited by examiner

*Primary Examiner*—Kurt Rowan
(74) *Attorney, Agent, or Firm*—Birch, Stewart, Kolasch & Birch, LLP

(57) ABSTRACT

The present invention relates to nets, preferably for fishing, webbed onto a discharging device, a discharging system and a method for manufacture of such nets and discharging systems. The net, the system and the method make possible to determine the opening of the net's meshes by way of a mounting-line and a netting-device coupled with the mounting-line, which permits the mounting of longer nets onto shorter net ropes. The mounting line is attached to the mesh-cell or mounting mesh-cell of the net to maintain a fixed opening size of the meshes, during discharge and operation of the net.

25 Claims, 4 Drawing Sheets

PRE-MOUNTED NETS ON DISCHARGING DEVICES AND A METHOD OF MANUFACTURE

FIELD OF INVENTION

Figure 1:
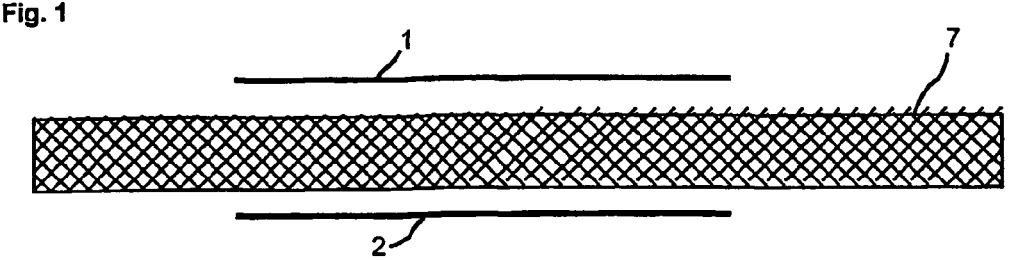

The present invention relates to nets for fishing, webbed onto a discharging device, a discharging system and a method for manufacture of such nets and discharging systems. The net, the system and the method make possible to determine the opening of the net's meshes by way of a mounting-line and a netting-device coupled with the mounting-line, which permits the mounting of longer nets onto shorter net ropes.

BACKGROUND OF THE INVENTION

Several methods for the mounting of nets onto ropes are known. However, two are the most common. One of them consists of webbing loose meshes onto a pipe and pulling a line through the pipe and then knitting the meshes onto a rope in order to attach the meshes. A second method consists of mounting the net on a pipe, and knitting clove hitches and thereafter a rope will be pulled through the pipe and the knots placed by hand onto the rope and tightened at regular intervals, the knots being on every second, third, fourth, fifth or sixth meshes. The main drawback of both methods is the fact that in both cases, a net needs to be knitted onto ropes, which is both a slow and costly way of mounting nets. However, the advantage of both methods is the fact that the nets will not slide on the ropes and therefore they ensure the correct opening of the meshes. A noticeable difference between the two methods is the fact that the latter is a much speedier mounting method than the first On the other hand, it's drawback is a certain lack of precision during the mounting process, and there is an inherent risk of sliding along the ropes in water, and of an alteration in the mesh opening, thus leading to a reduced capacity for catching fish in the nets. Nets which have been prepared with pre-tightened clove hitches on land, can be viewed as an inaccurate way of guaranteeing the correct opening of meshes, since as a rule, when ropes are pulled by any force such as water or wind under considerable strain, they tend to become stretched and leaner, so that pre-tightened clove hitches tend to become loose and slide on the ropes, and thus altering the predetermined openings of the net meshes.

The aim of the present invention is to remedy and eliminate those drawbacks. The present invention is a much speedier method of mounting-lines and prevents the sliding of knots, leading to altered mesh openings, by way of a mounting-line which determines the distance between fastening means on the rope and provides a self-tightening mechanism for the knots during field operation.

SUMMARY OF INVENTION

The present invention consists of nets for fishing, a discharge system and a method, which employs a mounting-line to mount nets equally onto net-ropes of fishing nets, in order to maintain the right mesh openings in the nets and to prevent the sliding of the knots in the water during fishing, thus preventing the nets from sliding sideways on the ropes and thereby reducing their fishing capabilities. The mounting-line ensures that the proper distance between the fastening means on the net will be constantly maintained. The fastening mean is usually a knot. This is possible since the mounting-line prevents the knots from sliding sideways, as it is attached to the net meshes with an even distance between them, and that the knots themselves are in their nature to be automatically self-tightening. This also ensures tightening of the knots around the net ropes in water due to the upward buoyancy of a floating rope against the downward pull of a sinking rope. The self-tightening knots are provided with an automatic device placing self-tightening knots to the mounting mesh cell and around the pipe. The mounting-line is webbed to the same mounting mesh as the self-tightening knot during the manufacturing process of nets, by casting them onto discharging device in order to ensure that predetermined separation between net-knots against the length of the mounting-line will be maintained. This makes it possible for the nets to be mounted onto shorter net-ropes without having to measure first the distance between the knots during the net mounting process, and thereby increasing the mounting output. The mounting-line in the netting-device does not require that the separation between each knot of the netting be measured, or the net-knots be removed from the pipe or requires that the knots around the net-rope be pre-tightened, since it will be the mounting-line, that determines the separation between the knots. The mounting-line also ensures that the knots are pulled off the pipe simultaneously to a net-rope, which is being pulled by mounting-line attached to the net-rope's front end. This secures a proper distance between the knots, which are constantly being tightened by forces acting in opposite directions in the water, whereas traditional net-knots tend to become loose on the net-rope under similar circumstances. By employing this method of mounting-lines to netting products, output during the mounting process will be considerably increased, precise separation between knots will be ensured, thus maintaining the right opening of net meshes and thereby enhancing their catch efficiency.

The embodiments of the invention are as further characterized in the claims.

DETAILED DESCRIPTION

In its broadest aspect the invention relates to a net or nets. The net has a plurality of net meshes and a top rope attached to one of the upper rows of the net meshes as well as a bottom rope attached to one of the bottom rows of the net meshes. The net further comprises a mounting line, which is attached to the mounting mesh-cell of the net to maintain a fixed opening size of the meshes during discharge of the net.

In the present context the top rope is a floating rope, being a rope that is equipped with floating devices inserted or attached to it. Furthermore, the top rope is of a certain diameter in order for it to penetrate the discharging device. The bottom rope is in the present context a sinking rope. The sinking rope is made from lead, steal or any other heave flexible material, but it could also be a rope with heavy objects attached to it. The bottom rope is also of a certain maximum diameter in order for it to penetrate the discharging device. In general, the top rope and bottom rope are referred to as net ropes, when describing the mounting.

In the present context the term mounting-line relates to a line that is fastened to a net's mounting meshbar. The mounting-line can be attached to the nets mounting meshbar by way of knots, smelting, hooking or gluing or any other fastening means (non reverse loops). The said mounting line should, together with the fastening means, correspond to the length of the net rope, which the net is to be mounted on. The mounting-line can be made from natural and/or synthetic material or any combination thereof, such as polypropylene, nylon, etc. The mounting-line can be of a diameter corresponding to the diameter of the mesh bar of the net, preferably less than 10 mm, more preferred less than 5 mm in diameter and most preferred less than 1 mm in diameter.

In a preferred embodiment of the present invention a net discharge system for a fishing vessel is described. The discharge system includes a discharge device, adapted to carry fishing net(s) and a corresponding mounting line. The discharge device is designed in a way that at one end it receives a net rope and at the other end it allows the net, together with the top rope, to slide off the device. The discharge system also includes a net having a plurality of meshes and corresponding fastening means forming open loops allowing it to be mounted on the discharging device and for the net rope to penetrate. The net is mounted onto a top rope and a bottom rope wherein the top rope has floating characteristics and the bottom rope is in its nature a sinking rope. The mounting-line is adapted to set the net meshes to a fixed opening during discharge of the net from the vessel and maintaining that certain opening during fishing in water.

In the present context, the said net ropes should have a diameter corresponding to the diameter of the discharge device, allowing the net ropes to penetrate the said discharge device. In a preferred embodiment of the present invention the discharge device is a pipe shaped object.

The mounting line is attached to the net mesh-bar and it can traverse the meshes of the net as well as the fastening means, which are used to attach the mounting-line to the discharge device. These fastening means can be traditional fishing knots, i.e. clove hitches or self-tightening fastening means. In the context of the present invention the mounting-line is capable of determining the opening of the net meshes when it is un-mounted of said discharge device.

The mounting line, of the present invention, is attached to the net by way of knots, smelting, hooking or gluing or any other fastening means (non reverse loops). Self-tightening fastening means, such as reversed clove hitches are adapted to the mounting-line and placed around the discharging device. The fastening means will therefore tighten fixedly around the net ropes upon discharging of the net and further tighten in the water by upwards buoyancy of the floating rope and the downwards pulling of the sinking rope. This will prevent sliding of the net on the net ropes during fishing.

An important feature of the invention is that the mounting line corresponds to the length of the top rope, on which the net is to be mounted. The mounting line has been pre-attached to the nets mesh-bar at certain distances, so the length of the mounting line and the distance between the fastening points of the mounting-line on the net, will in combination determine the opening of the net meshes during fishing.

The discharge system of the present invention can be made with a movable rod, which is placed above the discharge device. The fastening means, attached to the mounting mesh-cell, are placed around the rod as well as the discharge device. By adjusting the distance between the rod and the discharge device, the distance between the fastening means on the rope can be regulated, so that if the rod is further away from the discharge device the distance between the fastening means on the net rope will be shorter.

Another embodiment of the current invention is wherein an extra discharge device is added to the discharge system The net is then attached onto a top and a bottom rope, as well as additional ropes, placed anywhere in the middle section of the net. This is done to allow the net to be mounted on a second floating rope, placed in the middle section of the net, which can be useful when mounting drift nets.

The mounting line knots are at lest two, placed on opposite ends of the net rope, and preferably additional 3 or more knots placed between the two end knots and the distance between the knots as well as the number of knots can vary between the top rope and the bottom rope. In this manner the characteristics of the net can be regulated by the placement of the knots on the rope and thereby determining the opening of the net meshes.

In a most preferred embodiment of the present invention a method, to discharge pre-mounted and knitted nets, is described. The method comprises the following steps: Net(s) are mounted and webbed onto pipes, allowing the net ropes to penetrate the said pipes. A mounting-line is attached to at least two net mounting mesh-cells at certain distances and said mounting-line corresponds to the length of the net ropes. The front ends of each mounting-line and net rope are attached together after the front ends of the net ropes have penetrated through the pipes. The mounting-line is attached to the pipe with reversed clove hitches. The pre-mounted and knitted net(s) are mounted of the pipes by pulling the net-ropes and therefore the mounting-lines as well. In the most preferred embodiment of the present invention the discharging takes place from a vessel, such as a fishing boat. During the un-mounting, the reversed clove hitches are pulled off the pipe and onto the rope and it is during the un-mounting as well as towing the net(s) through water, that the knots will tighten around the net rope. The aft end of the mounting-line is finally attached to the aft end of the net rope when the whole net rope has penetrated the pipe. Then the net has been attached to the net ropes, where the mounting line has regulated the attachment of the net to the net ropes and the opening of the net meshes.

In another embodiment of the present invention, the mounting-line it-self is used to knit knots around the pipe but with all the net's mounting meshes loose. This is done in a way that after the line is attached to the net it is taken over the pipe and a knot is knitted and thereafter the mounting line is taken down again and attached to the next net mesh-cells. The knots in this case being clove hitches or other knots. If the mounting is done this way, a certain additional length needs to be added to the mounting-line. The addition to the mounting-line must be corresponding to the number of knots on the rope and according to it's circumference resulting in the length of the mounting-line corresponding to the length of the net-rope.

In a further embodiment of the invention the fastening means on the net's mounting mesh-cells are being placed around the discharging device, but the loose meshes are kept on the outside of the discharging device and placed on the mounting-line itself.

In yet another embodiment of the invention all meshes and the fastening means of the net are kept on the discharging device, and not on the mounting-line. This results in that whole net hangs on the net-rope and non of it on the mounting-line, but the mounting-line is still attached to some or all of the net's meshes and the front end of the net-rope regulating the mounting of the net onto the rope. It is also possible to place the mounting mesh-cells around the discharge device and the mounting-line is on the outside of the mounting mesh-cells of the net.

In another embodiment of the invention, the mounting-line has been placed on the inner side of the mounting mesh-cells on the discharging device. To further explain this, the net rope goes through the a row of net mesh-cells and the mounting-line is pulled through the same net's mesh-cells in the same way as it is attached to the net-rope as well as the inner side of the mounting mesh-cells. In this way the mounting-line is on the inner side of the mounting mesh-cells. In the same way the mounting mesh-cells are placed around the discharging device, but the mounting-line can be placed on the outside of the mounting mesh-cells of the net. The same goes for the bottom rope or an additional rope being placed in the middle section of the net, between the top rope and the bottom rope.

In the present context of the invention, the mounting-line is fastened the net's mounting mesh-bars by way of knots, smelting, hooking or gluing or any other fastening means (non reverse loops). Also, the length of the mounting-line, together with the fastening means, corresponds to the length of the rope on which the net is to be mounted In the present context, the net's meshes can be edged through the mounting-line by use of a needle, and the mesh's stitch be passed through the mounting-line that way.

Thereafter the mesh it self can be webbed onto the pipe and the net is attached to the mounting-line as the mounting line is pulled.

In the context of the present invention the mounting-line is fastened to a certain mesh-cell, defined as first mesh-cell and the then to a following mesh-cell, defined as a second mesh-cell. The second mesh-cell ban then be the same mesh-cell as the first mesh-cell, as well as other mesh-cells either in front of or behind said first mesh-cell as well as above or below said first mesh-cell. In this way the opening of the net meshes can be controlled by placement of knots to the mounting line and the places, where the mounting line is attached to the net.

A certain additional length is added to the mounting-line, corresponding to the number of mounting-line knots on the rope according to it's circumference. This is done because the length of the mounting line should be in the length of the net rope in order to regulate the opening of the net meshes by the mounting line and the distance between the fastening means on the net ropes.

The fastening means, used to attach the net and the mounting-line to the net ropes, can be knots. These knots can be traditional knots as well as self-tightening mounting knots that are knitted around the discharging device. The self-tightening knots can be clove hitch, reversed clove hitch, a clove hitch with an extra noose or any other self-tightening knots. In a preferred embodiment of the current invention, the knots, that are knitted around the net rope are self-tightening knots, which will be tightened around the net ropes by forces of the upwards buoyancy of the top rope and the downwards pulling of the bottom rope. In this case the self-tightening knot is a reversed clove hitch with an extra noose, which will be tightened during un-mounting of the net(s) and further tightened in the water.

To make the handling and the discharging of the net less laborious, the side meshes of the net can be pulled together from, pulling the outer meshes towards the middle part of the net(s). A rope is then tightened around the net(s) and the end of the rope is pulled through the side meshes. When the system has been mounted up the fastening rope can be pulled out and the side meshes will fall down and the net(s) is ready for discharge.

The floating ropes may be of different nature such as containing floating devices or made floating by any other means. In the same way the bottom rope used to keep the net in a vertical position in the water may constructed in any way and from any other additional material such as steal or lead to obtain a sinking rope.

FIGURE LEGENDS

FIG. 1. Shows a possible difference in length between a net (7) and a floating rope (1) as well as a lead rope (2).

Figure 2:
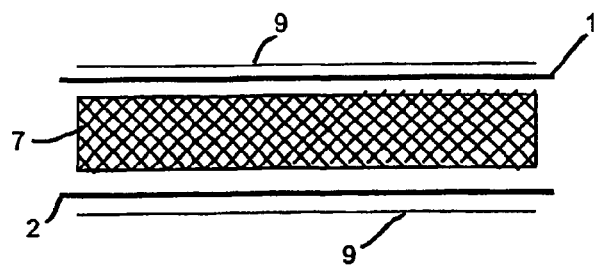

FIG. 2. Shows a net (7) twice the size of the net ropes is mounted on the net-ropes. The figure furthermore shows the length of the mounting-line (9) (shown as a broken line) above the floating rope (1) and below the lead rope (2).

In FIGS. 3–13 the mounting is only shown for one rope (top or bottom rope), although the net is always mounted onto at least two ropes. Furthermore in FIGS. 3–13 the top and bottom rope are mutally referred to as net rope.

Figure 3:
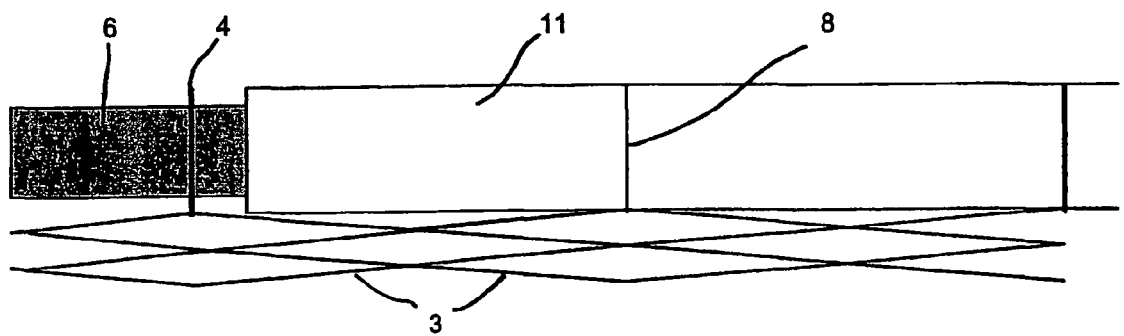

FIG. 3. Shows a net is being pulled of a pipe (11) without a mounting-line. A clove hitch (4), which is attached to the net rope pulls the mounting mesh (8) of the pipe and the meshes (3) of the net are attached to the floating rope resulting the net being mounted on the net-ropes in an uncontrolled way. This demonstrates a problem solved by the invention.

Figure 4:
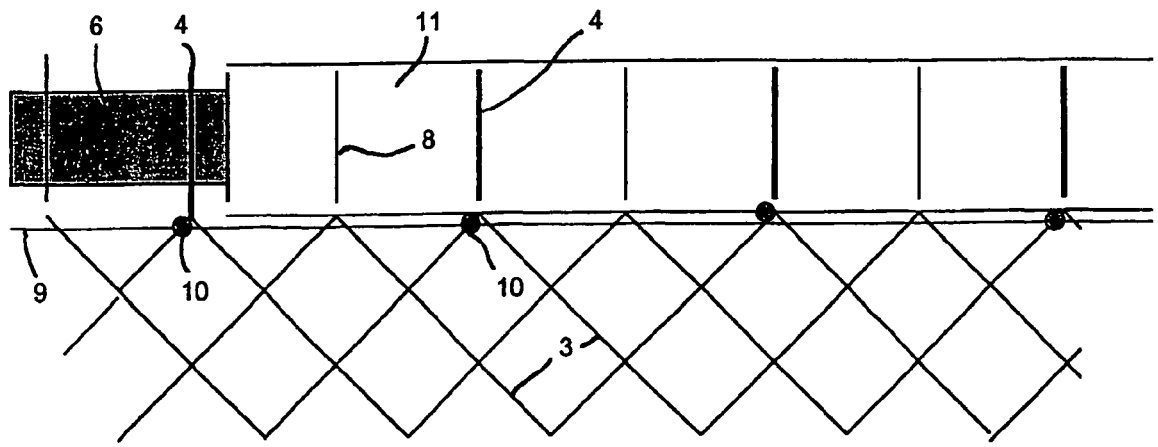

FIG. 4. Shows a net, which is being pulled of a pipe with a mounting-line (9) and the mounting-line (9) is attached to the mounting mesh (8). The mounting-line is attached to the net rope with self-tightening knots (10), which are fastened evenly to the mounting-line and knitted onto the pipe. As the net is pulled of the pipe the mounting-line determines the length between the knots knitted onto the net rope resulting in the desired opening of the net meshes (3) when the net has been mounted onto the net-ropes (6).

Figure 5:
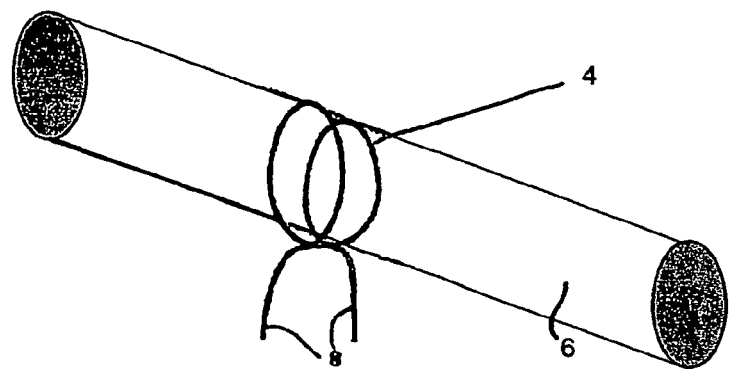

FIG. 5. Shows a traditional net knot (4), a so called clove hitch (4), but the net knots are knitted to the net meshes with a certain length between them. The knots are pre-tightened before the net is mounted onto the net-ropes. By pulling both ends of the mounting mesh (8) underneath the knot, the knot will be tightened around the net-rope (6).

Figure 6:
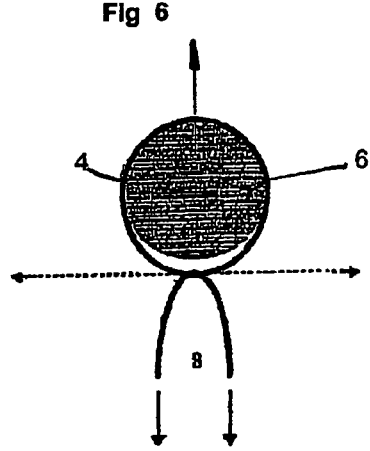

FIG. 6. Shows a traditional net knot and how it can loosen in water as the nets are being pulled onto a boat. As the net-ropes (6) are being pulled, the ropes extended and the diameter of the floating rope is reduced resulting in that the knots are not tightened around the net-rope. This is because even if the net is pulling the mounting mesh (8) down the traditional net knots are tightened by a lateral pulling of the net mesh-cells. This demonstrates a problem solved by the invention.

Figure 7:
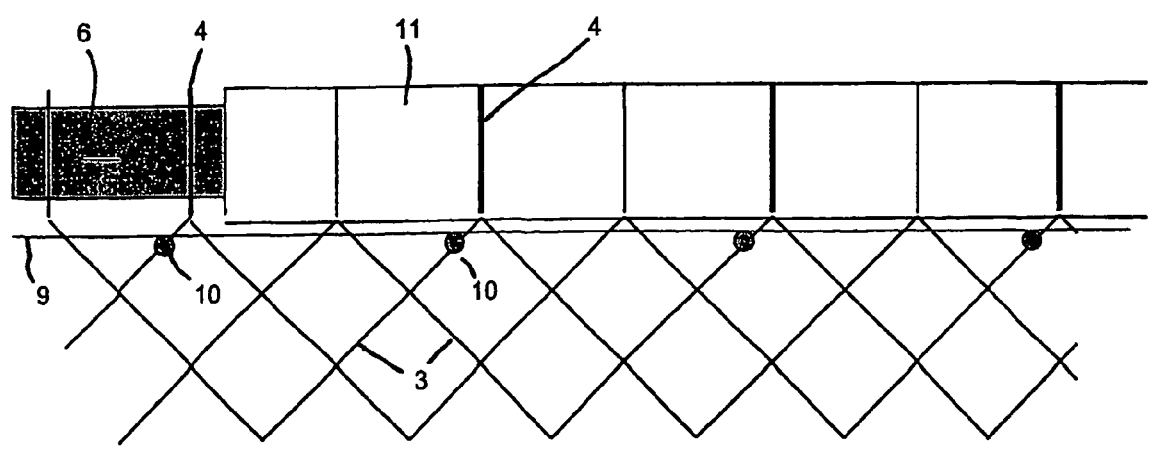

FIG. 7. A net being mounted using traditional net-knots (4) as shown in FIGS. 5 and 6, but using a mounting-line that is knitted onto the pipe with self-tightening knots (10) as well as to the mounting-line (9) at the by the close to where the mounting-line is attached to the net. The mounting-line is attached to net mesh-bars with a certain amount of net meshes loose between the meshes (3) attached to the mount-ing-line preventing sideways sliding of the knot on the net-ropes (6) and maintains the desired opening of the net meshes ensuring their capacity to fish.

Figure 8:
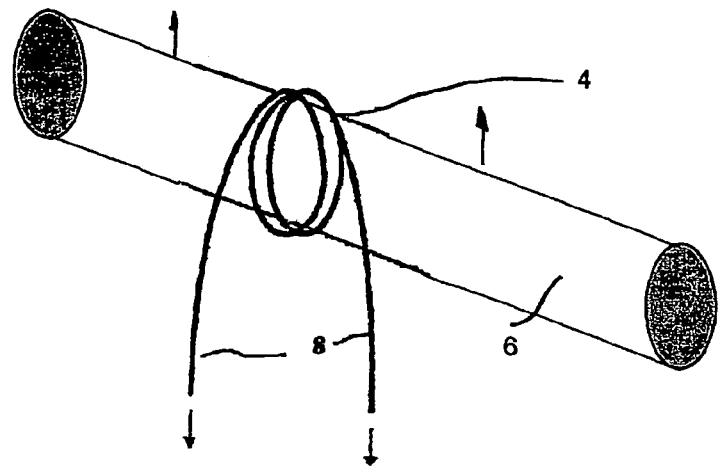

FIG. 8. Shows a reversed clove hitch on a net-rope (6). The knot is self-tightening and will be tightened by the downwards pulling of the mounting mesh (8).

Figure 9:
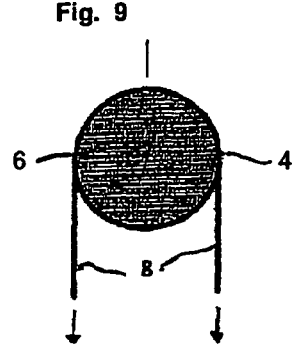

FIG. 9. Shows a cross-section of a net-rope (6) with a self-tightening knot (4) knitted around it. The downward pulling of the net, pulling the mounting mesh (8) down, and the upward buoyancy of the floating rope results in tight-ening of the reversed clove hitch.

Figure 10:
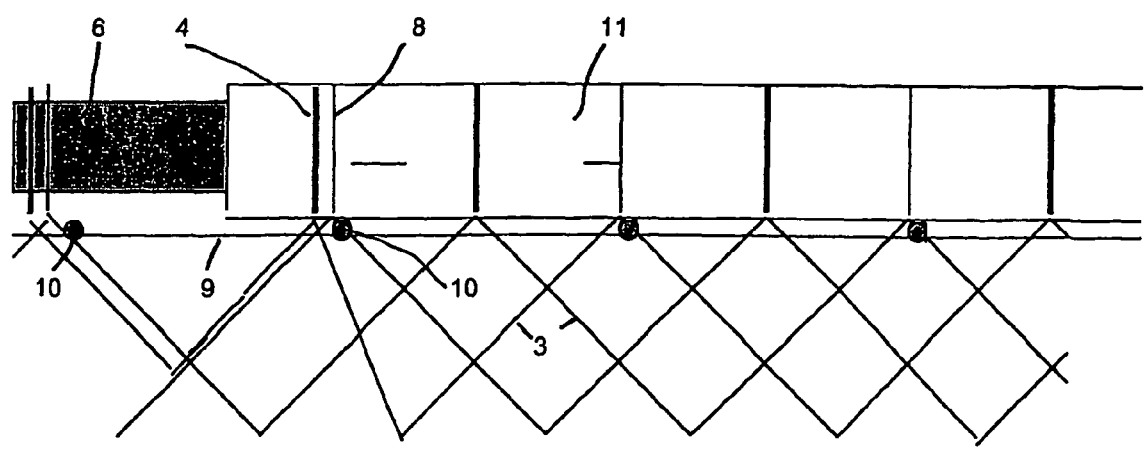

FIG. 10. Shows the placement of the self-tightening knots (10) of the mounting-line (9) on the mounting mesh (8) of the net. The figure demonstrates that the self-tightening knots (4) should be knitted to the mesh-cell behind the mounting mesh attached to the mounting-line in order to prevent that the knot will be tightened around the pipe (11)

instead of the floating rope. The same principle goes for the tightening of the knot around the floating-rope and maintaining the knot tightened.

Figure 11:
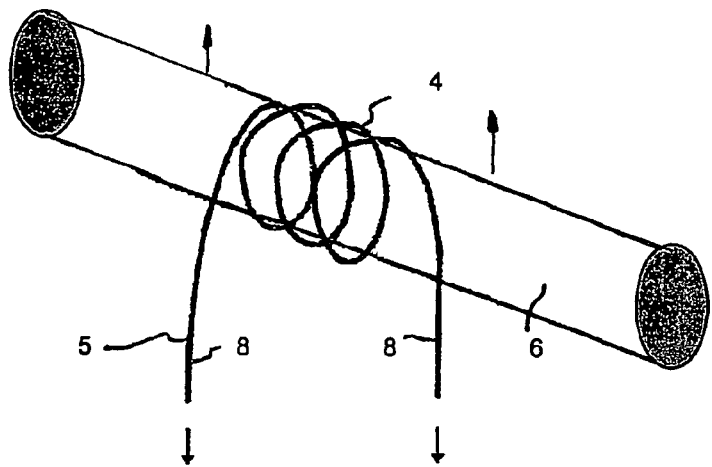

FIG. 11. Shows a clove hitch (4) with and extra noose (5) around a net-rope (6). When the mounting mesh (8) is pulled in water the knot is automatically tightened around the net-ropes.

Figure 12:
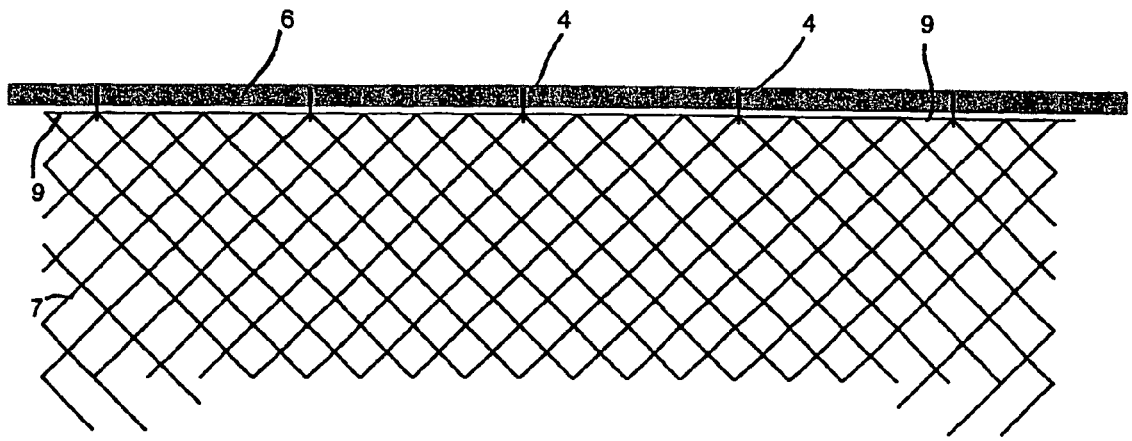

FIG. 12. A mounted net (7) with a mounting-line (9), where only the knots (4) are on the net-rope (6) and the mounting mesh (8) between the knots are kept on the mounting-line. This makes it easier to cut the nets of the net-ropes.

Figure 13:
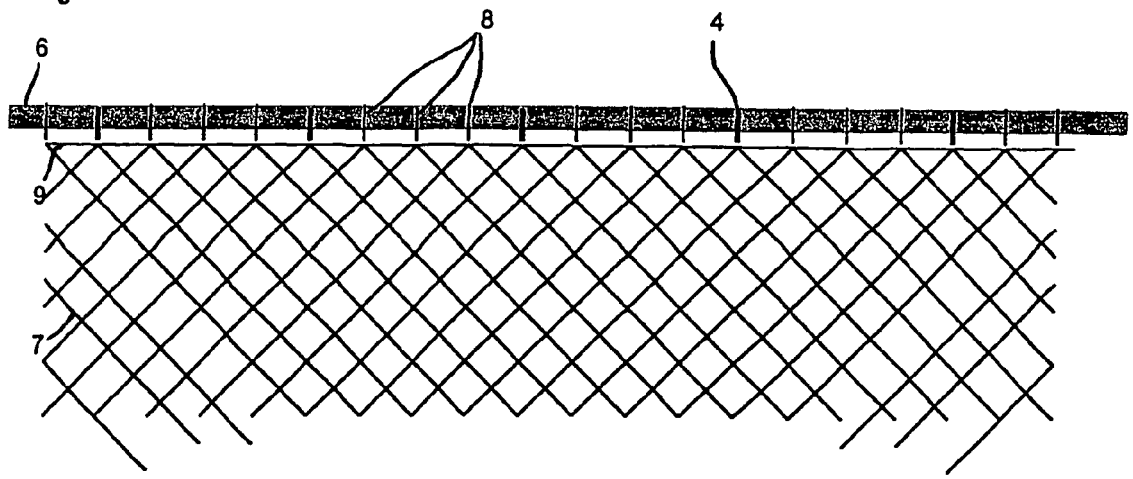

FIG. 13. A mounted net (7) with a mounting-line (9), where both the knots (4) and the mounting mesh (8) between the knots are on the net-rope (6). The figure demonstrates the even distribution of the net and a desired opening of the net meshes can be obtained.

NUMBER LIST

Following number are used in text and relate to items in figures.
1. Floating rope
2. Sinking rope
3. Meshes
4. Clove hitch
5. Extra noose
6. Net-ropes
7. Net
8. Mounting-mesh
9. Mounting-line
10. Self-tightening knots on mounting-line
11. Discharging device (a pipe)

The invention claimed is:

1. A net(s), comprising:
a net(s) having a plurality of net meshes,
a top rope attached to one of the upper rows of the meshes,
a bottom rope attached to one of the bottom rows of the meshes,
a discharge device, and
fastening means,
wherein, the net(s) further comprises a mounting line attached to mounting meshes to determine opening size of the meshes during discharge of the net(s), wherein the mounting line is attached to each end of the top rope,
wherein the net(s) is pre-mounted on the discharge device and the fastening means is attached to the mounting line and placed around the discharging device to attach the net(s) to the top rope is pulled through the discharge device during discharging of the net, and
wherein another mounting line, another fastening means and another discharge device are also used for attaching the net(s) to the bottom rope.

2. The net(s) according to claim 1, wherein the top rope is a floating rope.

3. The net(s) according to claim 1, wherein the bottom rope is a sinking rope.

4. The sinking rope according to claim 3, wherein the sinking rope is made partly from lead, steel or any other heavy flexible material.

5. The net(s) according to claim 1, wherein the mounting line is fastened to a net's mounting mesh bar by way of knots, smelting, hooking or gluing or any other fastening means (non reverse loops) and the length of the mounting line, together with the fastening means correspond to the length of the rope on which the net(s) is to be mounted.

6. The mounting line according to claim 1, wherein said mounting line can be made from natural and/or synthetic material or any combination thereof including polypropylene and nylon.

7. The mounting line according to any one of the preceding claims where said mounting line is of a diameter corresponding to the diameter of the mesh bar of the net(s) less than 10 mm.

8. A method to discharge pre mounted and knitted net(s), comprising the steps of:
attaching a net's mounting line to at least two net mesh-cells or mounting mesh-cells at certain distances and said mounting-line corresponds to the length of the net rope, the net(s) further, comprising:
a plurality of net meshes,
a top rope attached to one of the upper rows of the meshes,
a bottom rope attached to one of the bottom rows of the meshes, and a mounting line attached to the mesh cells,
mounting and webbing the net(s) onto a discharging device,
placing fastening means around the discharging device and said fastening means will be tightened around the net rope during discharging of the net(s) during field operation,
allowing the net rope to penetrate the discharging device, where the front end of the rope is attached to the mounting-line after the front end has penetrated through the discharging device,
unmounting the pre-mounted and knitted net(s) of the discharging device by pulling the net rope and therefore the mounting-line as well,
attaching the aft end of the mounting-line to the aft end of the net rope when the whole rope has penetrated the discharging device and then the net(s) has been attached onto the net rope.

9. The method according to claim 8, wherein the mounting line itself is knitted around the discharging device, but the mesh-cells that are not attached to the mounting-line are loose and then the mounting-line is mounted around the rope, but the mounting mesh-cells are loose.

10. The method according to claim 8, wherein the fastening means on the net's mounting mesh-cells are being placed around the discharging device, but the loose meshes are kept on the outside of the discharging device and placed on the mounting line itself.

11. The method according to claim 8, wherein all meshes and fastening means are kept on the discharging device and not on the mounting-line.

12. The method according to claim 8, wherein the mounting-line has been placed on the inner side of the mounting mesh-cells on the discharging device, so that the mounting-line can be placed this way in between/through the net's mounting mesh cells.

13. The method according to claim 8, wherein all the mounting mesh-cells are placed around the discharging device and the mounting-line is on the outside of the mounting mesh-cells of the net(s).

14. The method according to any one of claims 8–13, wherein an extra discharging device is arranged allowing the net(s) to be mounted on the second floating rope in the middle section of the net(s).

15. The method according to claim 8, characterized in that the mounting line is fastened to a certain net mesh cell, defined as first mesh-cell and then to a following mesh-cell, defined as a second net mesh-cell, being the same mesh-cell as the first mesh-cell, as well as other net meshes either in front of or behind said first mesh-cell as well as above or below said net first mesh-cell.

16. The method according to claim 8, wherein the mounting-line is fastened to the net's mounting mesh-bars by way of knots, smelting, hooking or gluing or any other fastening means (non reverse loops) and that the length of the mounting-line, together with the fastening means, corresponds to the length of the rope on which the net(s) is to be mounted.

17. The method according to claim 8, wherein the net's meshes are edged through the mounting-line by use of a needle, and the mesh's stitch be passed through the mounting line and the mesh it self thereafter be webbed onto the discharging device, by keeping the mounting line of the same length as the rope on which the net(s) is being mounted.

18. The method according to claim 8, wherein the net(s) is attached onto a top and a bottom rope, as well as additional ropes placed in the middle section of the net(s).

19. The method according to claim 8, wherein the mounting line knots are at lest two, placed on opposite end of the net rope, and preferably additional 3 or more knots placed between the two end knots and the distance between the knots as well as the number of knots can vary between the top rope and the bottom rope.

20. The method according to claim 8, wherein a certain additional length is added to the mounting-line, corresponding to the number of mounting-line knots on the rope according to it's circumference.

21. The method according to claim 8, wherein fastening means can be traditional knots or self-tightening mounting knots.

22. The method according to claim 21, wherein the self-tightening knots are clove hitch, reversed clove hitch or a clove hitch with an extra noose.

23. The method according to claim 8, wherein the discharging takes place from a vessel.

24. The method according to claim 16, wherein the knots around the floating rope are self tightening knots, which will be tightened around the top rope by forces of the upwards buoyancy of the top rope and the downwards pulling of the bottom rope.

25. The method according to claim 16, wherein the side meshes are pulled together from the outer meshes towards the middle part of the net(s), a rope is tightened around the net(s) and the end of the rope is pulled through the side meshes.

* * * * *